United States Patent
Hashimoto et al.

(10) Patent No.: US 10,630,218 B2
(45) Date of Patent: Apr. 21, 2020

(54) MOTOR CONTROL DEVICE

(71) Applicant: FANUC CORPORATION, Yamanashi (JP)

(72) Inventors: Shoutarou Hashimoto, Yamanashi (JP); Yuuki Morita, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 62 days.

(21) Appl. No.: 16/164,106

(22) Filed: Oct. 18, 2018

(65) Prior Publication Data

US 2019/0123671 A1   Apr. 25, 2019

(30) Foreign Application Priority Data

Oct. 19, 2017   (JP) .................................. 2017-202805

(51) Int. Cl.
*H02P 21/30* (2016.01)
*H02P 21/00* (2016.01)
*H02P 21/22* (2016.01)
*H02P 21/06* (2016.01)

(52) U.S. Cl.
CPC .......... *H02P 21/30* (2016.02); *H02P 21/0085* (2013.01); *H02P 21/06* (2013.01); *H02P 21/22* (2016.02)

(58) Field of Classification Search
CPC ....... H02P 21/30; H02P 21/0085; H02P 21/22
See application file for complete search history.

(56) References Cited

U.S. PATENT DOCUMENTS

| 4,843,292 A | * | 6/1989 | Ono | .................... B25J 9/126 |
| | | | | 318/606 |
| 2008/0303476 A1 | * | 12/2008 | Iwashita | ............. H02P 21/0003 |
| | | | | 318/766 |

FOREIGN PATENT DOCUMENTS

| JP | 3-121738 | 5/1991 |
| JP | 2734095 | 3/1998 |
| JP | 2001-169593 | 6/2001 |
| JP | 2008-306798 | 12/2008 |
| JP | 2010-246318 | 10/2010 |
| JP | 2013-223329 | 10/2013 |

OTHER PUBLICATIONS

Notification of Reasons for Refusal dated Aug. 20, 2019 in corresponding Japanese Patent Application No. 2017-202805.

* cited by examiner

*Primary Examiner* — Cortez M Cook

(74) *Attorney, Agent, or Firm* — Wenderoth, Lind & Ponack, L.L.P.

(57) ABSTRACT

A motor control device including: an operation control part that generates a torque command based on an operation command, and controls a rotational position and/or rotational speed of the spindle; a current control part that generates an excitation current command to control secondary magnetic flux of the induction motor, and a torque current command to control torque of the induction motor based on the torque command; a change detection part that detects a change in operation command requiring increasing the secondary magnetic flux of the induction motor; a magnetic flux amplification part that performs magnetic flux amplification to temporarily increase the excitation current command or a magnetic flux command in the current control part, in a case of a change in the operation command being detected; and a gain change part that changes gain of the operation control part when performing magnetic flux amplification.

4 Claims, 14 Drawing Sheets

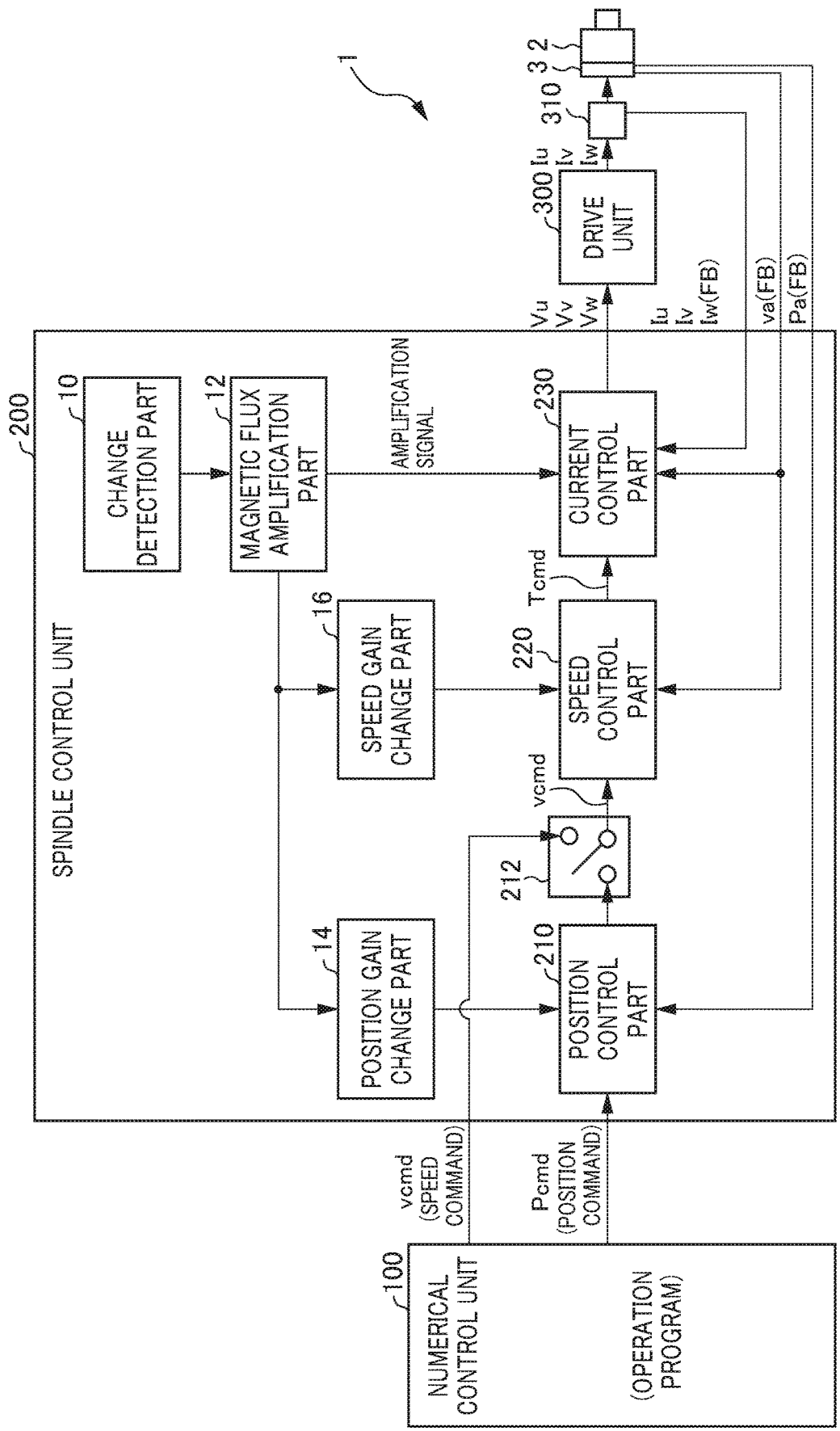

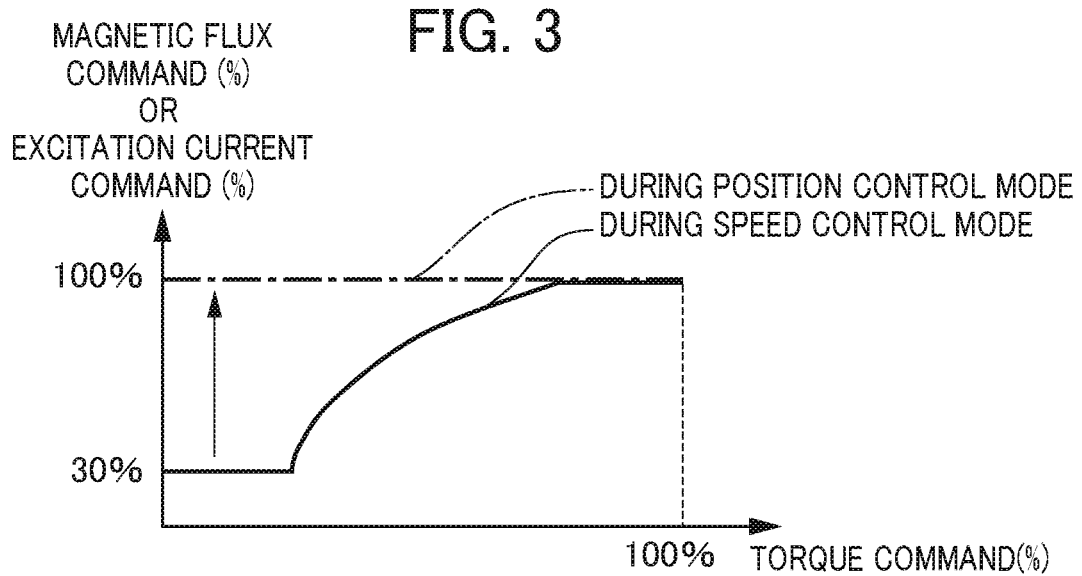
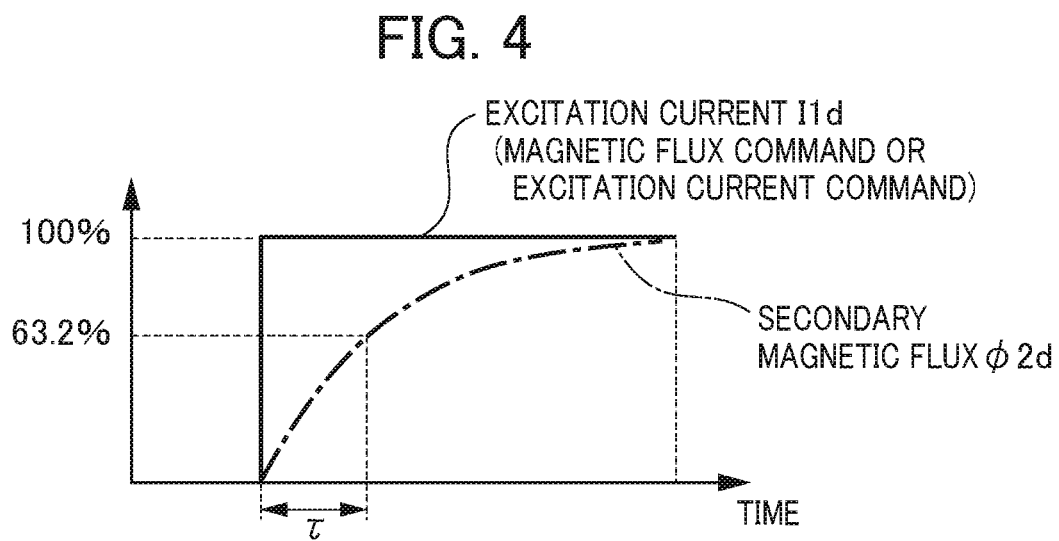

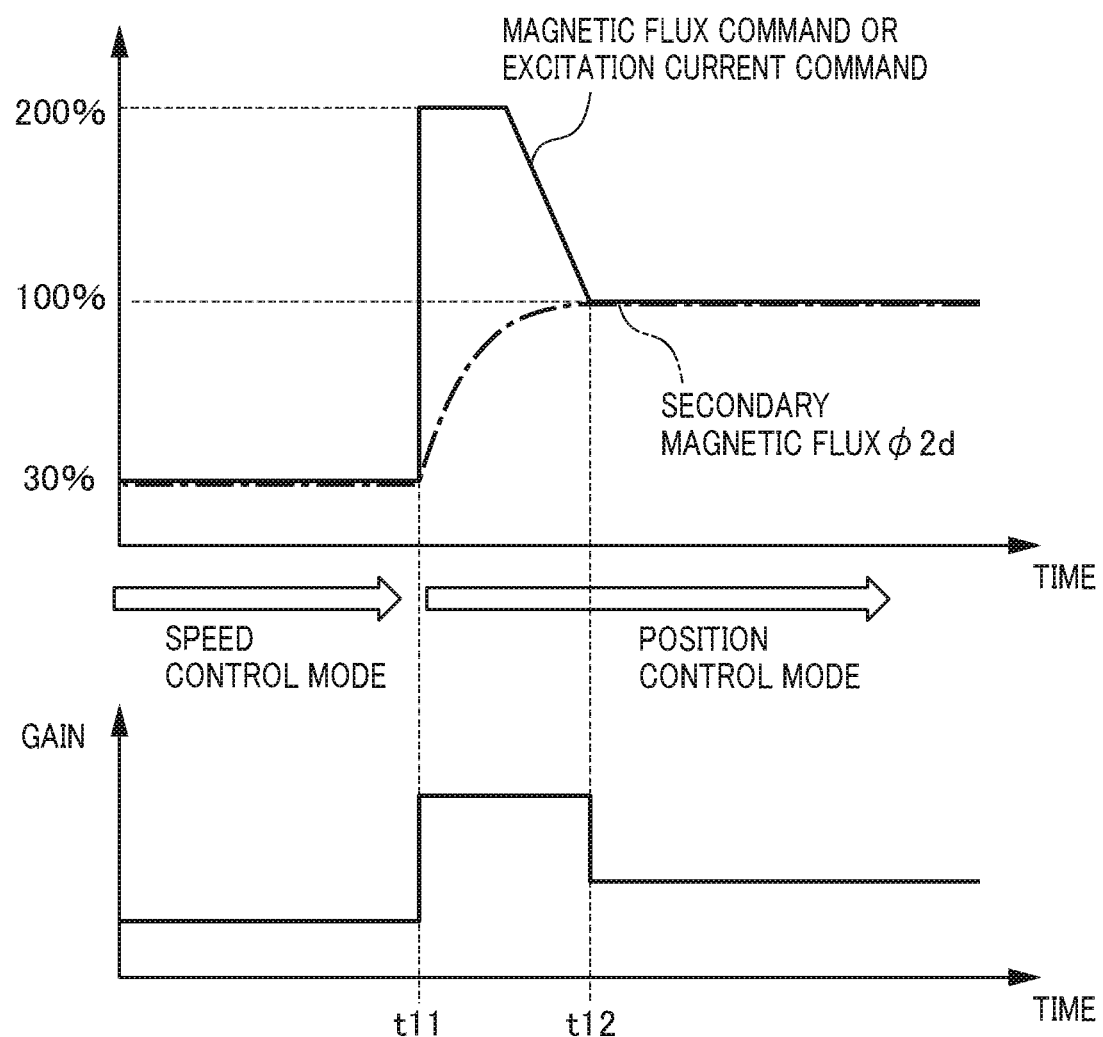

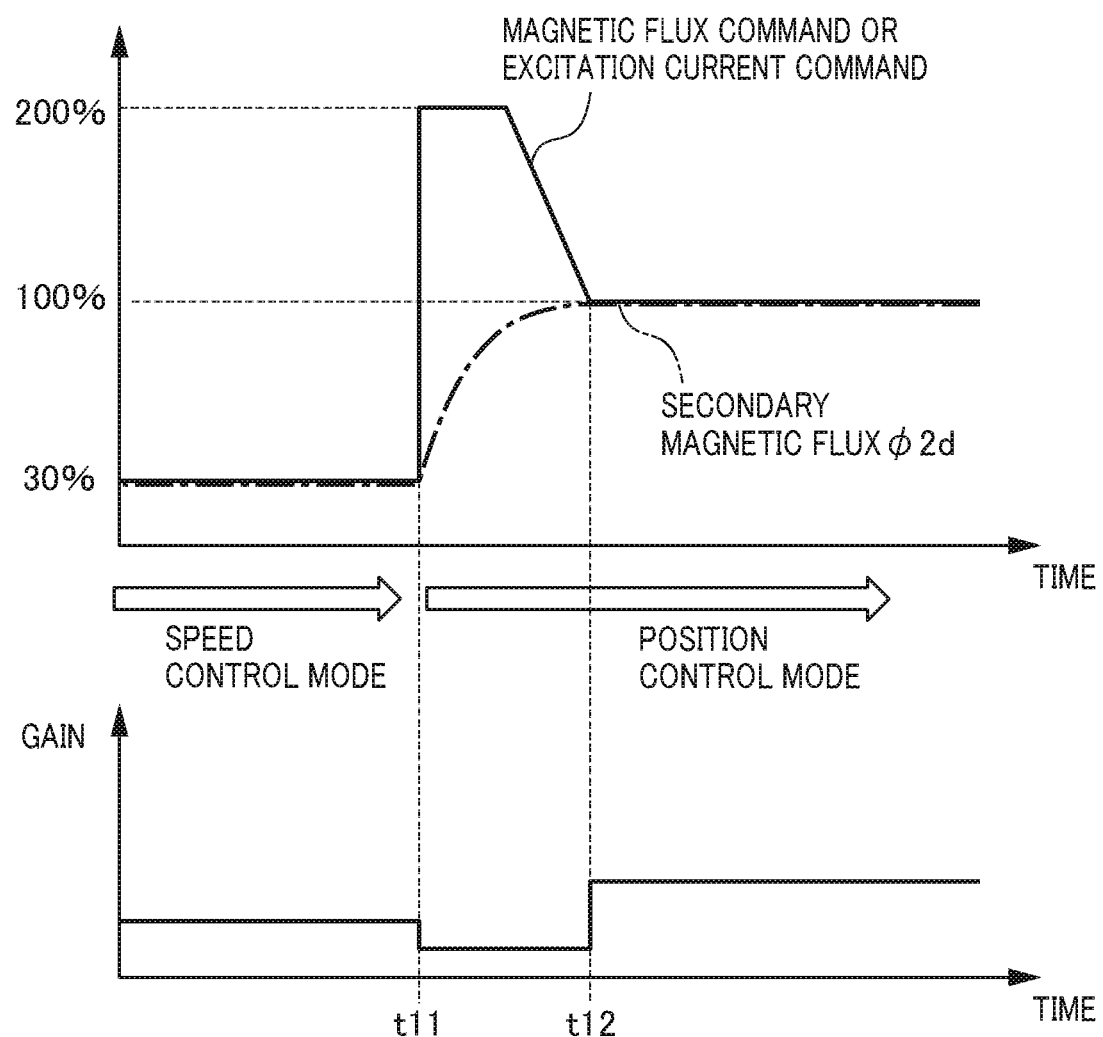

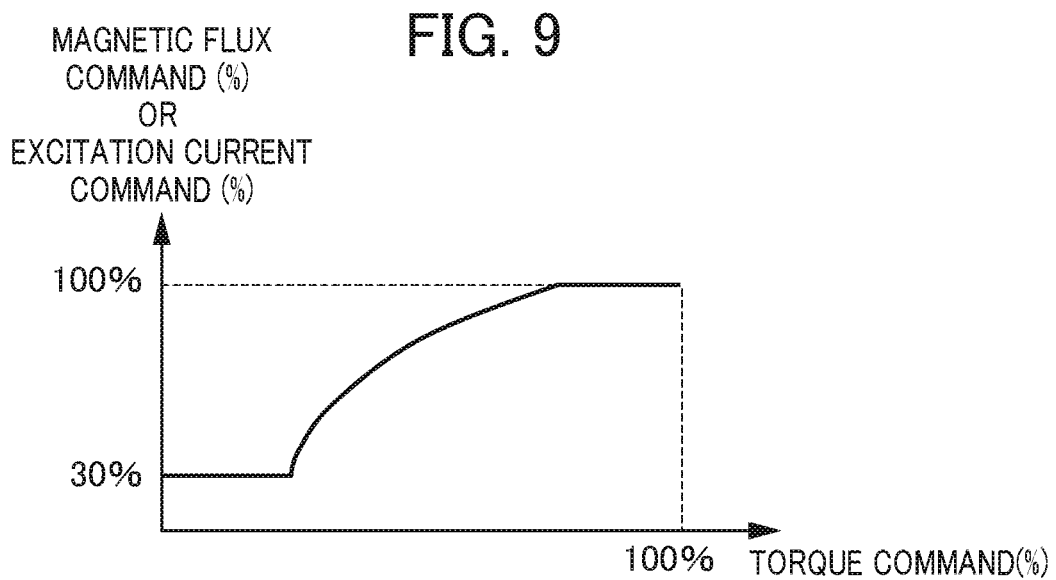

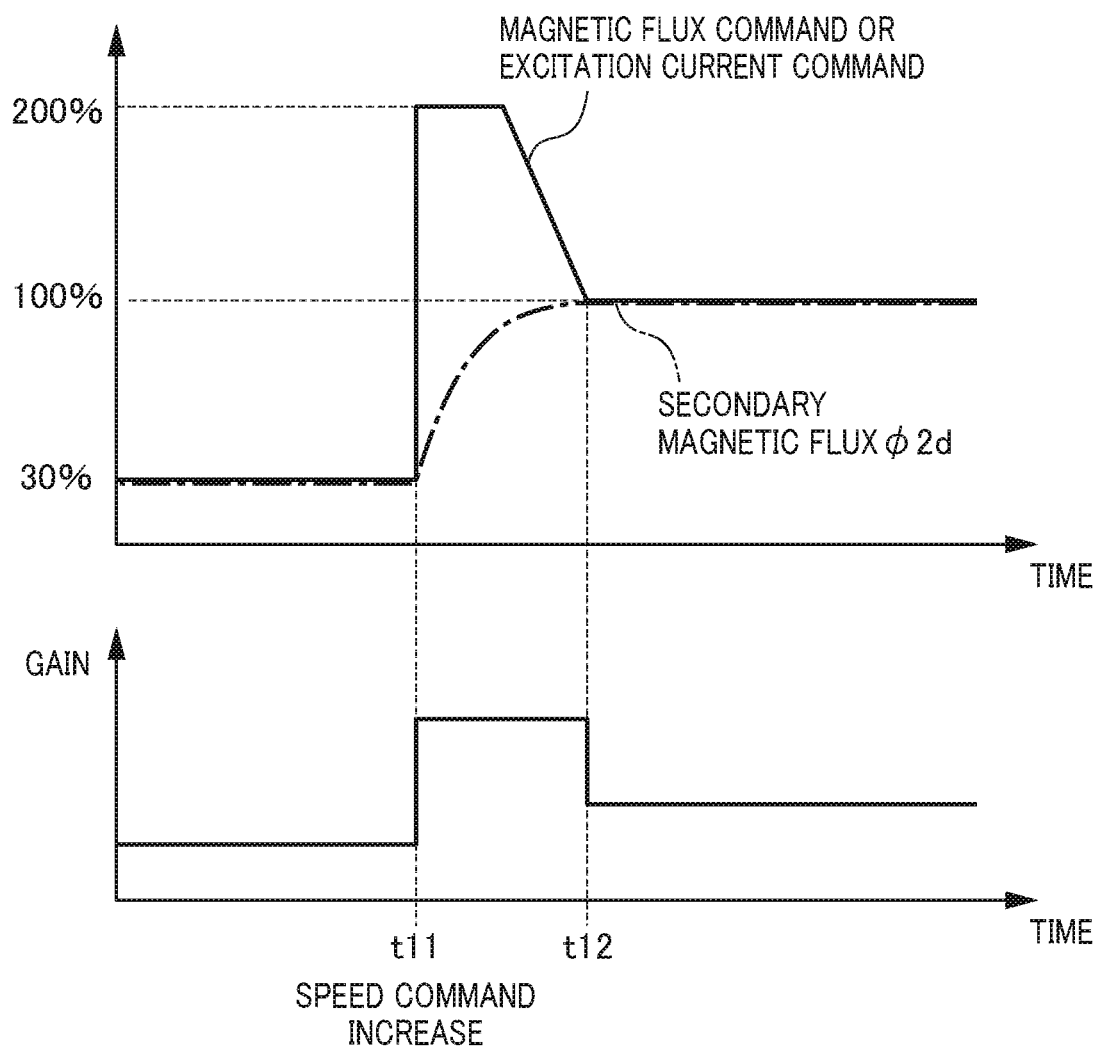

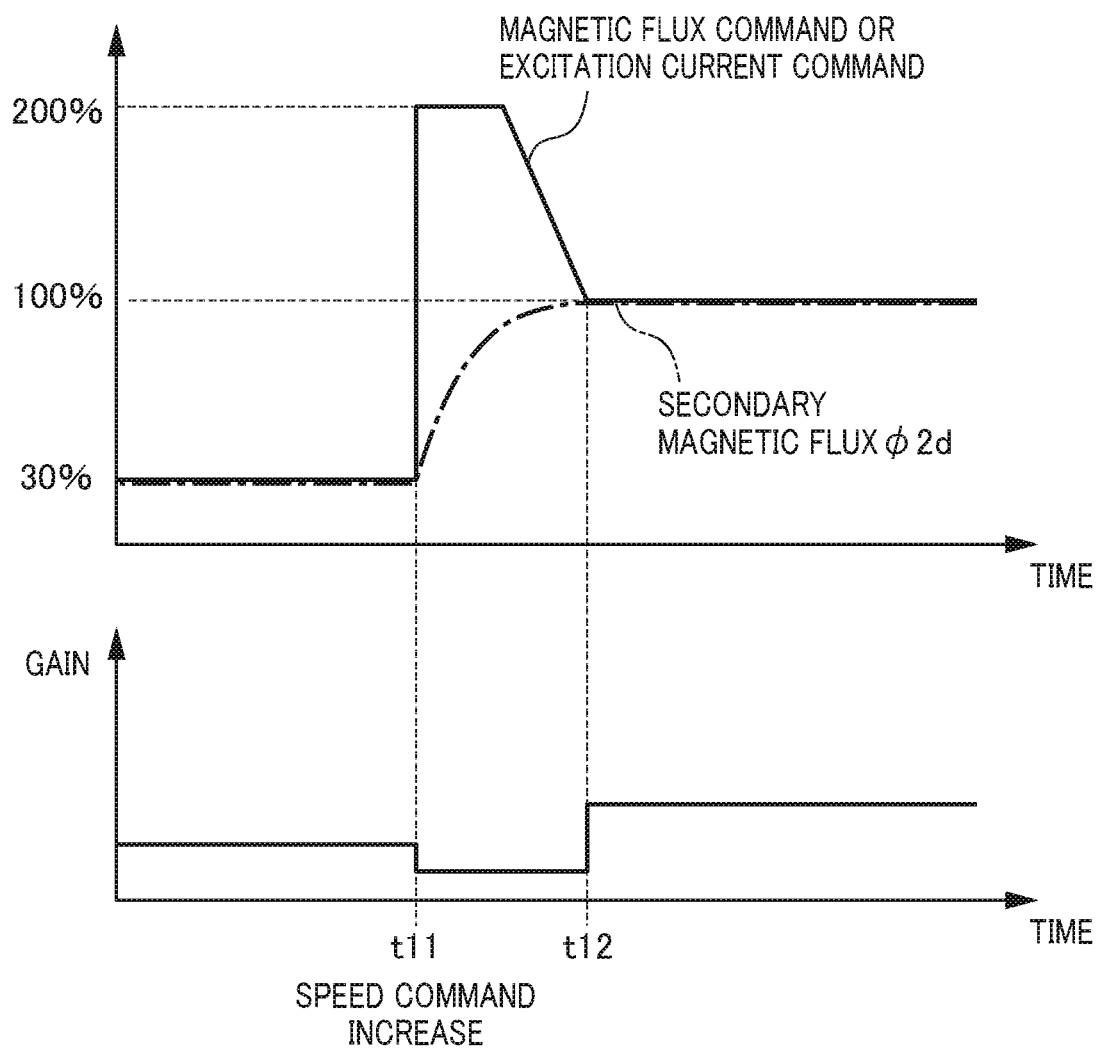

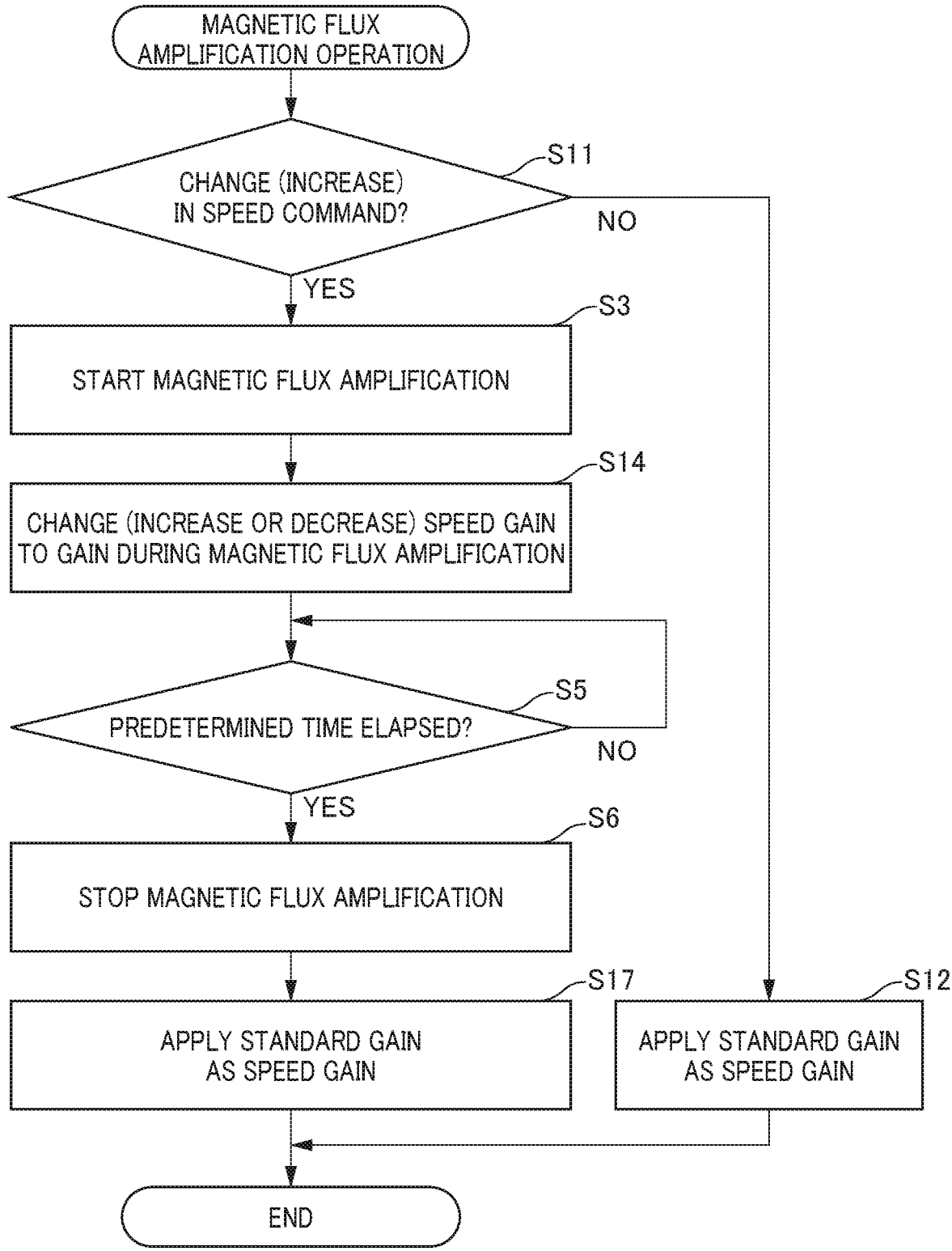

US 10,630,218 B2

MOTOR CONTROL DEVICE

This application is based on and claims the benefit of priority from Japanese Patent Application No. 2017-202805, filed on 19 Oct. 2017, the content of which is incorporated herein by reference.

BACKGROUND OF THE INVENTION

Field of the Invention

The present invention relates to a motor control device for controlling an induction motor that drives the spindle of a machine tool.

Related Art

Induction motors have been used as the spindle motor of a machine tool. Patent Documents 1 and 2 describe motor control devices that control such induction motors. Patent Document 1 describes technology related to vector control that controls a primary current supplied to the induction motor by dividing into excitation current for magnetic flux generation and torque current. Patent Document 2 describes technology for switching between speed control based on a speed command and position control based on a position command.

Patent Document 1: Japanese Unexamined Patent Application, Publication No. 2013-223329
Patent Document 2: Japanese Unexamined Patent Application, Publication No. 2008-306798

SUMMARY OF THE INVENTION

The induction motor is a motor that causes a rotating magnetic field to be generated by flowing excitation current to the stator coil, as well as causing induction current to generate in the rotor, in which the rotor rotates so as to follow the rotation of the rotating magnetic field by way of this electromagnetic force. In the induction motor, there is a disadvantage in that heating follows due to the excitation current flowing to the stator coil. With the purpose of avoidance of this disadvantage, in the case of the load on the induction motor being light, and high torque not being required, there is a magnetic flux weakening technology which weakens the magnetic flux of the rotating magnetic field or excitation current.

However, high responsiveness is demanded also during light load, in position control based on the position command. For this reason, in the case of using magnetic flux weakening technology, when switching from speed control to position control in a state in which torque is low due to weakening the magnetic flux of the induction motor, then immediately after increasing the excitation current following the change from the speed command to the position command, it is not possible to obtain sufficient torque due to the magnetic flux not rising sufficiently, and thus the responsiveness of the position control declines. In addition, in the case of performing acceleration/deceleration during speed control based on the speed command, high torque becomes necessary. For this reason, in the case of using magnetic flux weakening technology, immediately after increasing the excitation current following the speed command when performing acceleration/deceleration in a state in which torque became low due to weakening the magnetic flux of the induction motor, it is not possible to obtain sufficient torque due to the magnetic flux not sufficiently rising, and the acceleration time extends. In other words, the responsiveness of control declines. For this reason, during control mode switching from speed control to position control, or during acceleration/deceleration in speed control, it has been necessary to start operation after waiting for the magnetic flux to sufficiently rise. If this waiting time occurs every time during control mode switching or during acceleration/deceleration, the machining time will lengthen.

In relation to this point, there is technology which hastens the rise in magnetic flux by increasing the magnetic flux command during control mode switching or during acceleration/deceleration (magnetic flux amplification, magnetic flux boost) (refer to Patent Document 2). In the case of using this technology, it is possible to hasten the rise in secondary magnetic flux, thereby expediting the operation start of position control or operation start after acceleration. However, there is a problem in that a transient phenomenon arises in that the induction motor 2 will move during magnetic flux amplification due to causing the excitation current to suddenly change. In other words, the stability of control declines.

The present invention has an object of providing a motor control device achieving a reduction in heat generation, high responsiveness in control, and high stability in control.

(1) A motor control device (for example, the motor control device 1, 1A described later) according to the present invention is a motor control device that controls an induction motor (for example, the induction motor 2 described later) which drives a spindle of a machine tool, the motor control device including: an operation control part (for example, the position control part 210 and speed control part 220 described later (FIG. 1), or the speed control part 220 described later (FIG. 8)) that generates a torque command based on an operation command, and controls a rotational position and/or rotational speed of the spindle; a current control part (for example, the current control part 230 described later) that generates an excitation current command to control secondary magnetic flux of the induction motor, and a torque current command to control torque of the induction motor (2) based on the torque command, and performs vector control on the induction motor (2); a change detection part (for example, the change detection part 10 described later) that detects a change in operation command requiring increasing the secondary magnetic flux of the induction motor; a magnetic flux amplification part (for example, the magnetic flux amplification part 12 described later) that performs magnetic flux amplification to temporarily increase the excitation current command or a magnetic flux command for generating the excitation current command in the current control part, in a case of a change in the operation command being detected by the change detection part; and a gain change part (for example, the position gain change part 14 and speed gain change part 16 described later (FIG. 1), or speed gain change part 16 described later (FIG. 8)) that changes gain of the operation control part when performing magnetic flux amplification by the magnetic flux amplification part.

(2) In the motor control device described in (1), the gain change part may increase the gain of the operation control part, when performing magnetic flux amplification by the magnetic flux amplification part.

(3) In the motor control device described in (1), the gain change part may decrease the gain of the operation control part, when performing magnetic flux amplification by the magnetic flux amplification part.

(4) In the motor control device described in any one of (1) to (3), a time of magnetic flux amplification by the magnetic flux amplification part may be determined based on a time constant related to a change in secondary magnetic flux of the induction motor (2).

(5) In the motor control device (for example, the motor control device 1 described later) described in any one of (1) to (4), the operation control part may include: a position control part (for example, the position control part 210 described later) that controls rotational position of the spindle based on a position command; and a speed control part (for example, the speed control part 220 described later) that controls rotational speed of the spindle based on a speed command; in which a change in the operation command may be a change in operation command from the speed command to the position command; the gain change part may include: a position gain change part (for example, the position gain change part 14 described later) that changes a position gain of the position control part; and a speed gain change part (for example, the speed gain change part 16 described later) that changes a speed gain of the speed control part, and may change at least one among the position gain and the speed gain.

(6) In the motor control device (for example, the motor control device 1A described later) described in any one of (1) to (4), the operation control part may have a speed control part (for example, the speed control part 220 described later) that controls the rotational speed of the spindle based on a speed command; the change in the operation command may be an increase in the speed command; and the gain change part may have a speed gain change part (for example, the speed gain change part 16 described later) which changes the speed gain of the speed control part.

According to the present invention, it is possible to provide a motor control device achieving a reduction in heat generation, high responsiveness in control, and high stability in control.

BRIEF DESCRIPTION OF THE DRAWINGS

FIG. 1 is a view showing the configuration of a motor control device according to a first embodiment;

FIG. 3 is a schematic drawing of magnetic flux weakening control of an induction motor during speed control and magnetic flux control of an induction motor during position control;

FIG. 4 is a schematic drawing of excitation current of an induction motor and secondary magnetic flux during control mode switching from speed control to position control;

FIG. 6A is a schematic drawing of an example of magnetic flux amplification operation by the motor control device according to the first embodiment;

FIG. 6B is a schematic drawing of another example of magnetic flux amplification operation by the motor control device according to the first embodiment;

FIG. 9 is a schematic drawing of magnetic flux weakening control of an induction motor;

FIG. 11A is a schematic drawing of magnetic flux amplification operation by the motor control device according to the second embodiment;

FIG. 11B is a schematic drawing of another example of magnetic flux amplification operation by the motor control device according to the second embodiment; and FIG. 12 is a flowchart of magnetic flux amplification operation by the motor control device according to the second embodiment.

DETAILED DESCRIPTION OF THE INVENTION

Figure 2A:
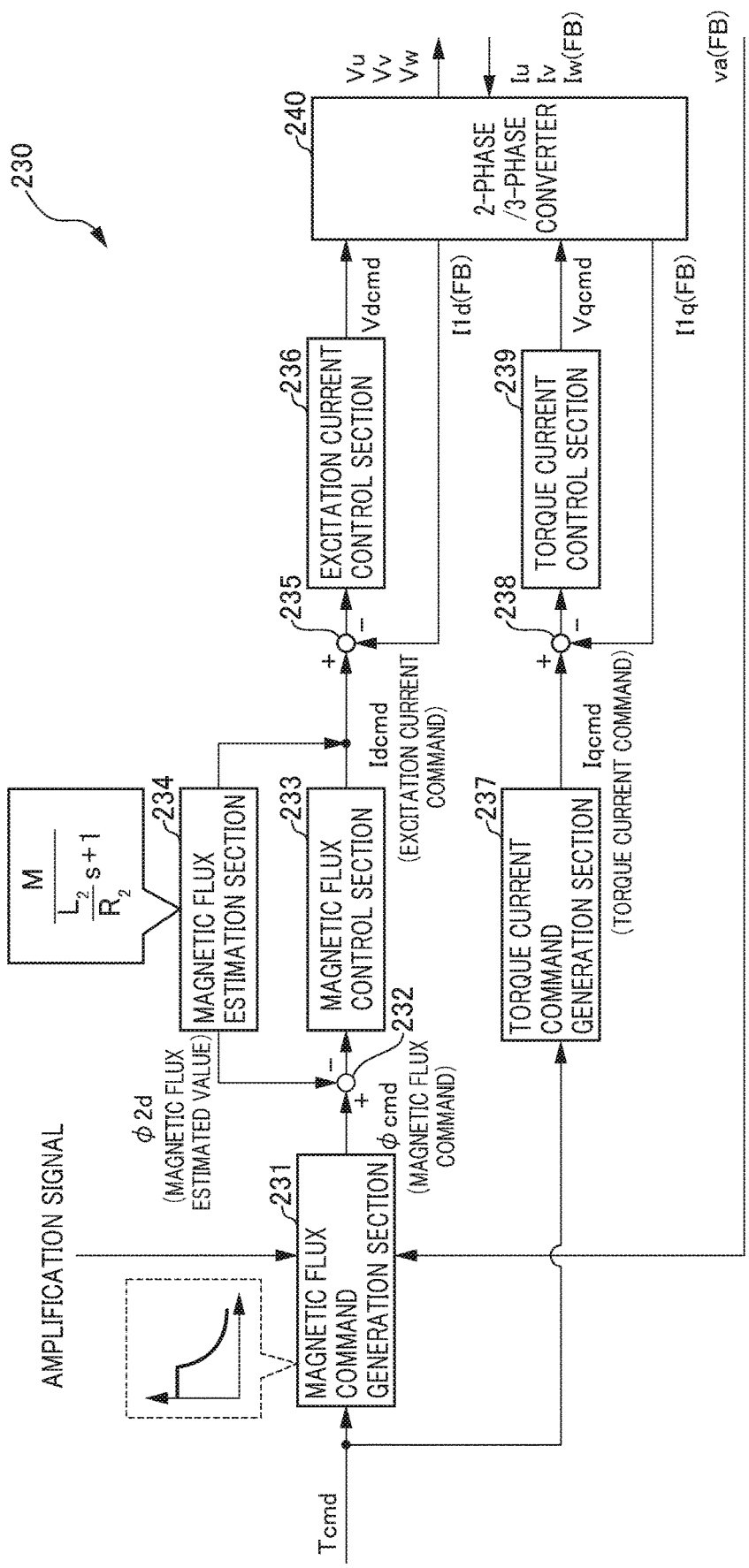
FIG. 2A is a view showing an example of the configuration of a current control part of a spindle control unit shown in FIGS. 1 and 8.

Hereinafter, examples of embodiments of the present invention will be explained by referencing the attached drawings. It should be noted that the same reference symbols shall be attached to portions which are the same or corresponding in the respective drawings.

First Embodiment

FIG. 1 is a view showing the configuration of a motor control device according to the first embodiment. A motor control device 1 shown in FIG. 1 is a device for controlling an induction motor 2 which rotationally drives a spindle of a machine tool such as a spindle processing machine. The motor control device 1 includes a numerical control unit (CNC) 100, spindle control unit 200, and drive unit 300.

The numerical control unit 100 stores an operation program (also referred to as machining program) of the machine tool. It should be noted that the numerical control unit 100 may be configured so as to acquire an operation program of the machine tool stored in an external device. The numerical control unit 100 performs switching of control mode between speed control mode based on speed command and position control mode based on a position command, based on this operation program (machining program). During speed control mode, the numerical control unit 100 generates a speed command vcmd for controlling the rotational speed of the spindle, and supplies this to the spindle control unit 200. In addition, during position control mode, the numerical control unit 100 generates a position command Pcmd for controlling the rotational position of the spindle, and supplies this to the spindle control unit 200.

During speed control mode, the spindle control unit 200 controls the induction motor 2 to drive in accordance with the speed command vcmd from the numerical control unit 100. In addition, during position control mode, the spindle control unit 200 controls the induction motor 2 to drive in accordance with the position command Pcmd from the numerical control unit 100. The spindle control unit 200 includes a position control part 210, control switching part 212, speed control part 220 and current control part 230. In the present embodiment, the position control part 210 and speed control part 220 constitute an operation control part that controls the rotational position and/or rotational speed of the spindle.

The position control part 210 generates a speed command vcmd based on the difference between the position command Pcmd from the numerical control unit 100 and the feedback Pa of the position (rotational position) of the induction motor 2 detected by an encoder 3 provided to the induction motor 2. The position control part 210 is configured by a gain-settable controller such as a PI controller including a proportioner and an integrator, or a P controller including a proportioner, for example.

The control switching part 212 switches between a speed command vcmd from the position control part 210 and a speed command vcmd from the numerical control unit 100, based on a control mode switching signal from the numerical control unit 100, for example. More specifically, the control switching part 212 supplies the speed command vcmd from the numerical control unit 100 to the speed control part 220 during speed control mode. In addition, the control switching part 212 supplies the speed command vcmd from the position control part 210 to the speed control part 220 during position control mode.

The speed control part 220 generates a torque command Tcmd based on the difference between the speed command vcmd from the numerical control unit 100 or speed command vcmd from the position control part 210, and the actual speed (speed FB) va of the induction motor 2 detected by the encoder 3 provided to the induction motor 2. The speed control part 220 is configured by a gain-settable controller such as a PI controller including a proportioner and integrator, for example.

The current control part 230 generates voltage commands Vu, Vv, Vw for driving the drive unit 300 based on the torque command Tcmd from the speed control part 220, the actual speed va from the encoder 3, and output current of the drive unit 300 detected by a current detector 310 provided to the drive unit 300, i.e. actual currents (current FB, drive current) Iu, Iv, Iw for driving the induction motor 2.

The numerical control unit 100 and spindle control unit 200 (and numerical control unit 100A and spindle control unit 200A described later), for example, are configured by arithmetic processors such as a DSP (Digital Signal Processor), or FPGA (Field-Programmable Gate Array). The functions of the numerical control unit 100 and spindle control unit 200 (and numerical control unit 100A and spindle control unit 200A described later) are realized by executing predetermined software (programs) stored in a storage unit, for example. The functions of the numerical control unit 100 and spindle control unit 200 (and numerical control unit 100A and spindle control unit 200A described later) may be realized by cooperation between hardware and software, or may be realized by only hardware (electronic circuits).

The drive unit 300 generates the actual current (drive current) Iu, Iv, Iw for driving the induction motor 2, based on the voltage commands Vu, Vv, Vw from the current control part 230. The drive unit 300, for example, is configured by a converter that converts commercial 3-phase AC power into DC power, and an inverter that converts the DC power from the converter into 3-phase AC power. In this case, the voltage command Vu, Vv, Vw is used as the control voltage of the inverter.

Figure 2B:
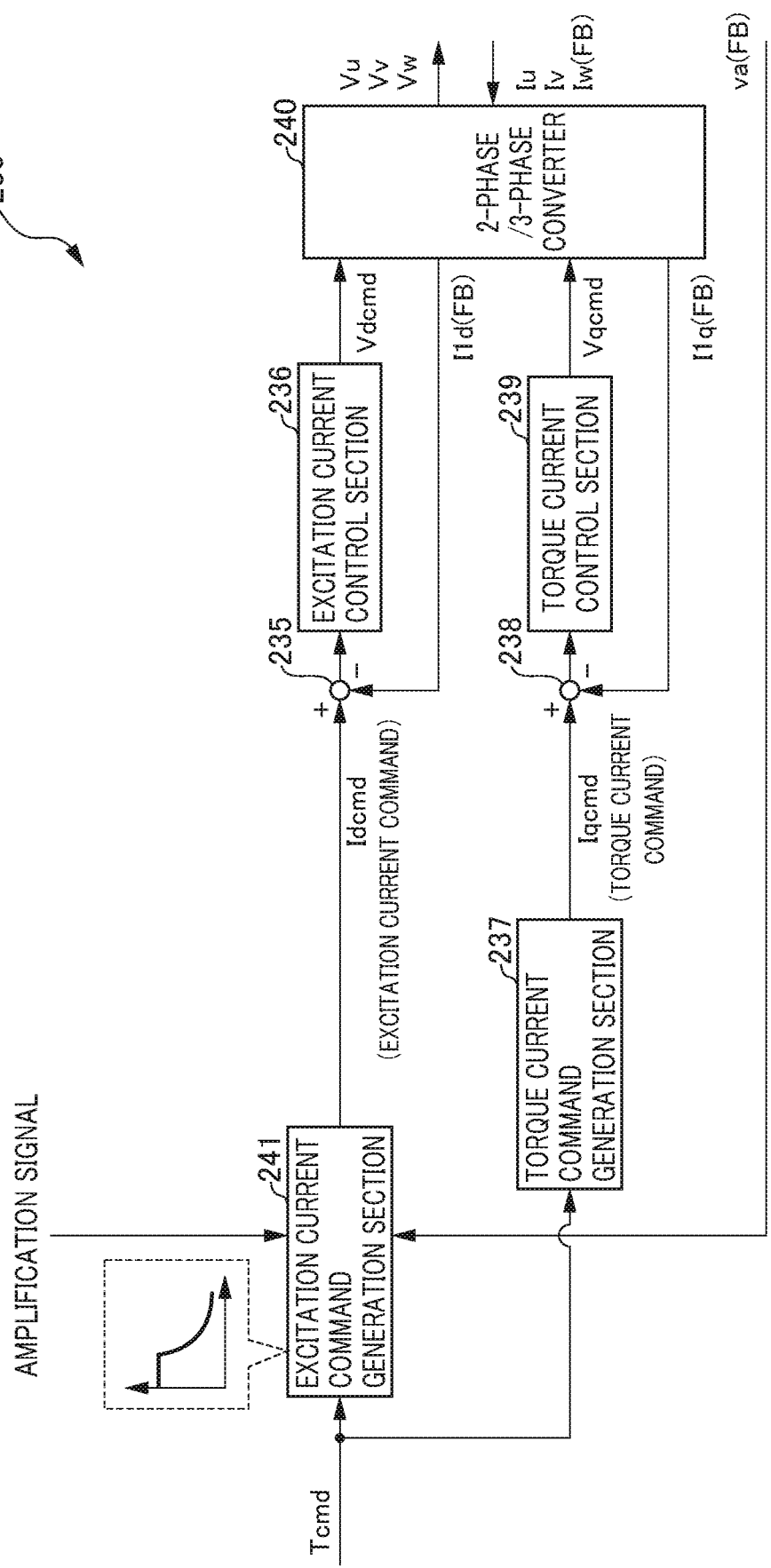
FIG. 2B is a view showing another example of the configuration of a current control part of the spindle control unit shown in FIGS. 1 and 8.

FIG. 2A is a view showing an example of the configuration of the current control part 230 of the spindle control unit 200 shown in FIG. 1, and FIG. 2B is a view showing another example of the configuration of the current control part 230 of the spindle control unit 200 shown in FIG. 1. The current control part 230 (i.e. spindle control unit 200) shown in FIGS. 2A and 2B performs vector control which controls the primary current of the induction motor 2, i.e. drive current, by dividing into excitation current for magnetic flux generation (d-phase current) and torque current for torque generation (q-phase current).

The current control part 230 shown in FIG. 2A includes a magnetic flux command generation section 231; subtracters 232, 235 and 238; magnetic flux control section 233; magnetic flux estimation section 234; excitation current control section 236; torque current command generation section 237; torque current control section 239; and 2-phase/3-phase converter 240.

The magnetic flux command generation section 231 generates a magnetic flux command Φcmd for magnetic flux generation of the induction motor 2, based on the torque command Tcmd, and actual speed (speed FB) va of the induction motor 2.

The subtracter 232 obtains the difference between the magnetic flux command Φcmd, and an estimated value Φ2d for the secondary magnetic flux of the induction motor 2 estimated by the magnetic flux estimation section 234. The magnetic flux control section 233 generates an excitation current command (d-phase current command) Idcmd based on the difference between the magnetic flux command Φcmd obtained by the subtracter 232 and the magnetic flux estimated value Φ2d. The magnetic flux estimation section 234 estimates the secondary magnetic flux Φ2d of the induction motor 2 according to the following formula (1), based on the excitation current command Idcmd generated by the magnetic flux control section 233, mutual inductance M of the induction motor 2 stored in the storage unit (omitted from illustration), for example, and the time constant $\tau = L_2/R_2$ decided by the circuit constant of the induction motor 2.

$$\phi_{2d} = \frac{M}{\frac{L_2}{R_2}s + 1} I_{dcmd} \quad (1)$$

It should be noted that the magnetic flux estimation section 234 may estimate the secondary magnetic flux Φ2d of the induction motor 2 according to the following formula (2), using the feedback I1*d* of the excitation current (d-phase current) of the induction motor 2 in place of the excitation current command Idcmd.

$$\phi_{2d} = \frac{M}{\frac{L_2}{R_2}s + 1} I_{1d} \quad (2)$$

In this way, the magnetic flux command generation section 231, subtracter 232, magnetic flux control section 233 and magnetic-flux estimation section 234 estimate the secondary magnetic flux Φ2d of the induction motor 2 from the excitation current command Idcmd or excitation current I1*d* by considering the primary delay of the time constant $\tau = L_2/R_2$ as in the above formula (1) or above formula (2), and generate the excitation current command Idcmd from the error between the magnetic flux command Φcmd and the magnetic flux estimated value Φ2d.

The subtracter 235 obtains the difference between the excitation current command Idcmd generated by the magnetic flux control section 233, and the feedback I1*d* of the excitation current (d-phase current) in which the actual currents Iu, Iv, Iw were converted by the 2-phase/3-phase converter 240. The excitation current control section 236 generates the d-phase voltage command Vdcmd based on the difference between the excitation current command Idcmd and the feedback I1d of the excitation current.

The torque current command generation section 237 generates the torque current command (q-phase current command) Iqcmd based on the torque command Tcmd.

The subtracter 238 obtains the difference between the torque current command Iqcmd generated by the torque current command generation section 237 and the feedback I1q of the torque current (q-phase current) in which the actual currents Iu, Iv, Iw were converted by the 2-phase/3-phase converter 240. The torque current control section 239 generates the q-phase voltage command Vqcmd based on the difference between the torque current command Iqcmd and the feedback I1q of the torque current.

The 2-phase/3-phase converter 240 converts the d-phase voltage command Vdcmd and q-phase voltage command Vqcmd to the voltage commands Vu, Vv, Vw of the uvw respective phases. In addition, the 2-phase/3-phase converter 240 converts the actual currents Iu, Iv, Iw of the uvm respective phases to the excitation current (d-phase current) I1d and torque current (q-phase actual current) I1q.

The current control part 230 shown in FIG. 2B includes the excitation current command generation section 241 in place of the magnetic flux command generation section 231, subtracter 232, magnetic flux control section 233 and magnetic flux estimation section 234 of the current control part 230 shown in FIG. 2A. The excitation current command generation section 241 generates the excitation current command (d-phase current command) Idcmd based on the torque command Tcmd and actual speed (speed FB) va of the induction motor 2.

In this way, the current control part 230 shown in FIG. 2B controls the secondary magnetic flux Φ2d of the induction motor 2 indirectly by directly commanding the excitation current by way of the excitation current command generation section 241. Herein, even when the induction motor 2 supplies the excitation current (d-phase current) I1d as shown in the above formula (2), the secondary magnetic flux Φ2d will rise being delayed by the time constant $\tau = L_2/R_2$. Concerning this point, the current control part 230 shown in FIG. 2A estimates the secondary magnetic flux Φ2d of the induction motor 2 from the excitation current by considering the primary delay of the time constant $\tau = L_2/R_2$, by the magnetic flux command generation section 231, subtracter 232, magnetic flux control section 233 and magnetic flux estimation section 234, and generates the excitation current command Idcmd from the error between the magnetic flux command Φcmd and magnetic flux estimated value Φ2d. The current control part 230 in FIG. 2A can thereby improve the controllability of the induction motor 2 in a transient state during excitation current change more than the current control part 230 in FIG. 2B.

However, during speed control based on the speed command, the motor control device 1 controls (magnetic flux weakening control) the secondary magnetic flux (excitation current) of the induction motor 2 to be small, in the case of the load of the induction motor 2 being light and high torque not being required for a heating reduction of the induction motor 2 (during light load). For example, the current control part 230 shown in FIG. 2A changes the magnetic flux command according to the torque command, so as to make the magnetic flux command gradually smaller as the torque command becomes smaller as shown in FIG. 3 (solid line), by the magnetic flux command generation section 231. In addition, the current control part 230 shown in FIG. 2B changes the magnetic flux command according to the torque command so as to make the excitation current command gradually smaller as the torque command becomes smaller, as shown in FIG. 3 (solid line), by the excitation current command generation section 241.

On the other hand, the magnetic flux command or excitation current command during light load is set to be large in order for high responsiveness (trackability relative to the command) to be obtained also during light load in the position control based on the position command. For example, with the current control part 230 shown in FIG. 2A, the magnetic flux command is always set to 100% irrespective of the torque command as shown in FIG. 3 (dashed line), by the magnetic flux command generation section 231. In addition, with the current control part 230 shown in FIG. 2B, the excitation current command is always set to 100% irrespective of the torque command as shown in FIG. 3 (dashed line), by the excitation current command generation section 241.

For example, if switching from the speed control mode to position control mode when setting the magnetic flux command or excitation current command to 30% according to the magnetic flux weakening control in the speed control mode in the stopped state (during light load), the magnetic flux command or excitation current command changes from 30% to 100%. At this time, the actual secondary magnetic flux Φ2d rises to be delayed by the time constant $r = L_2/R_2$ relative to the excitation current I1d, i.e. magnetic flux command or excitation current command, as shown in FIG. 4.

The torque T of the induction motor 2 is represented by the product of secondary magnetic flux Φ2d and torque current (q-phase current) I1q as shown in the below formula (3).

$$T = 3N_P \frac{M}{L_2} \phi_{2d} I_{1q} \tag{3}$$

Np: number of pole pairs

Figure 5A:
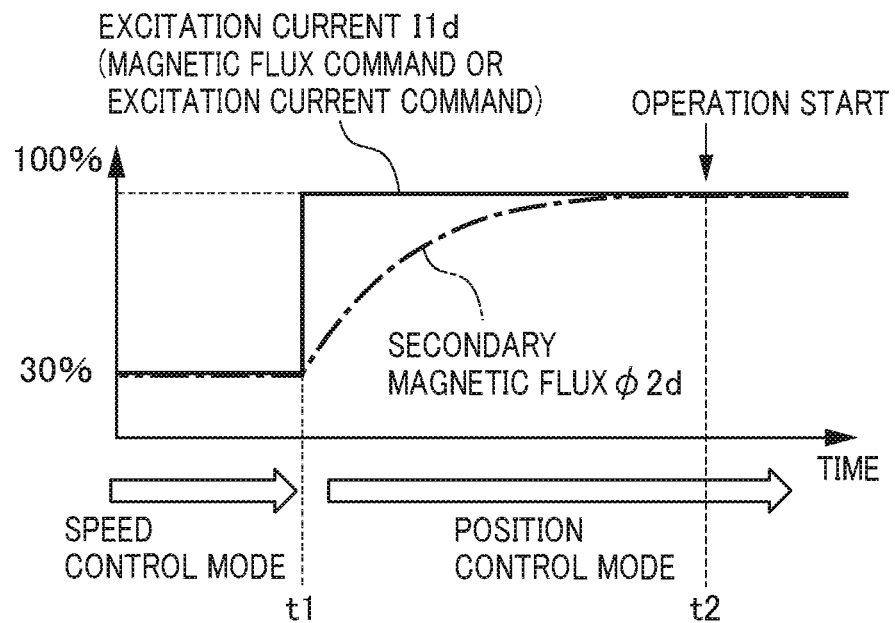
FIG. 5A is a schematic drawing of excitation current of an induction motor and secondary magnetic flux during control mode switching from speed control to position control.

For this reason, in the case of the control mode changing from the speed control mode to the position control mode as shown in FIG. 5A, immediately after increasing the magnetic flux command or excitation current command (immediately after time t1), it is not possible to output sufficient torque due to the secondary magnetic flux (Φ2d not rising sufficiently, and the responsiveness of position control declines. For this reason, during control mode switching, it was necessary to wait until the secondary magnetic flux sufficiently rises, and then start operation (time t2). When this waiting time occurs every time during control mode switching, the machining time lengthens.

Figure 5B:
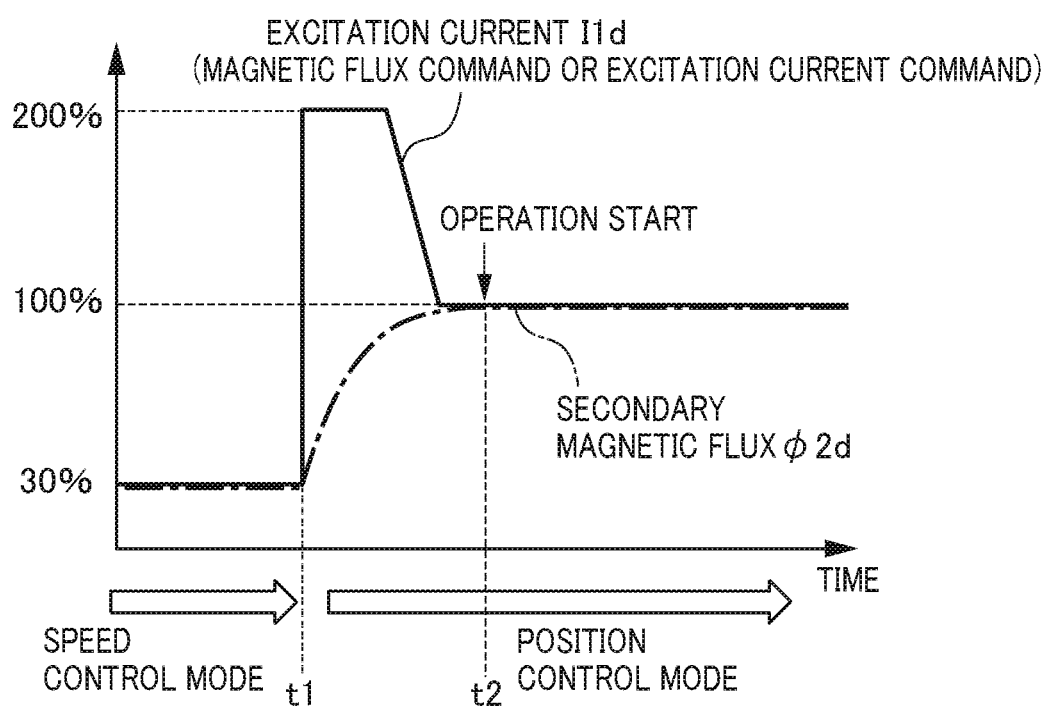
FIG. 5B is a schematic drawing of magnetic flux boost control of an induction motor.

In relation to this point, there is technology which hastens the rise of secondary magnetic flux by increasing the magnetic flux command or excitation current command during control mode switching to at least 100% (magnetic flux amplification, magnetic flux boost) (refer to Patent Document 2). For example, the current control part 230 shown in FIG. 2A amplifies the magnetic flux command to 200%, for example, for a predetermined time (time t1), when switching from the speed control mode of 30% magnetic flux command to the position control mode of 100% magnetic flux command, as shown in FIG. 5B, by way of the magnetic flux command generation section 231. In addition, the current control part 230 shown in FIG. 2B amplifies the excitation current command to 200%, for example, for a predetermined time (time t1), when switching from the speed control mode of 30% excitation current command to the position control mode of 100% excitation current command, as shown in FIG. 5B, by way of the excitation current command generation section 241. It is thereby possible to hasten the rise of secondary magnetic flux, and thus expedite the operation start of position control (time t2). However, there is a problem in that a transient phenomenon occurs where the torque variation occurring by quickly changing the excitation current becomes greater than the static friction force, whereby the induction motor 2 moves during magnetic flux amplification.

Therefore, in the present embodiment, during a change in operation command from speed command to position command as shown in FIGS. 6A and 6B, magnetic flux amplification to temporarily increase the magnetic flux command or excitation current command (t11–t12) is performed, along with changing (increase or decrease) at least one gain among position gain in position control and speed gain in speed control.

More specifically, as shown in FIG. 1, the spindle control unit 200 includes a change detection part 10, magnetic flux amplification part 12, position gain change part 14, and speed gain change part 16.

The change detect part 10 detects variation in operation command from speed command to position command, i.e. change in operation command which requires increasing the secondary magnetic flux Φ2d of the induction motor 2. The change detection part 10 detects variation in the operation command from speed command to position command, based on the aforementioned control mode switching signal, for example.

The magnetic flux amplification part 12 performs magnetic flux amplification to temporarily increase the magnetic flux command or excitation current command, in the case of variation from speed command to position command being detected by the change detection part 10. For example, the magnetic flux amplification part 12 transmits an amplification signal to the magnetic flux command generation section 231 of the current control part 230, as shown in FIGS. 1 and 2A. The magnetic flux command generation section 231 thereby increases the magnetic flux command when the control mode switches from speed control to position control (time t11), as shown in FIGS. 6A and 6B. In addition, the magnetic flux amplification part 12 transmits an amplification signal to the excitation current command generation section 241 of the current command part 230, as shown in FIGS. 1 and 2B. The excitation current command generation section 241 thereby increases the excitation current command, when the control mode switches from speed command to position command (time t11), as shown in FIGS. 6A and 6B. The time (t11–t12) of magnetic flux amplification by the magnetic flux amplification part 12 is determined based on the time constant $\tau = L_2/R_2$ of the induction motor 2.

The position gain change part 14 changes the position gain of the position control part 210, when performing magnetic flux amplification by the magnetic flux amplification part 12. For example, as shown in FIG. 6A, the position gain change part 14 may increase the position gain of the position control part 210, during magnetic flux amplification (t11–t12). Alternatively, as shown in FIG. 6B, the position gain change part 14 may decrease the position gain of the position control part 210, during magnetic flux amplification (t11–t12).

The speed gain change part 16 changes the speed gain of the speed control part 220, when performing magnetic flux amplification by the magnetic flux amplification part 12. For example, as shown in FIG. 6A, the speed gain change part 16 may increase the speed gain of the speed control part 220, during magnetic flux amplification (t11–t12). Alternatively, as shown in FIG. 6B, the speed gain change part 16 may decrease the speed gain of the speed control part 220, during magnetic flux amplification (t11–t12).

It should be noted that both change of the position gain in the position control part 210 by the position gain change part 14 and change of the speed gain in the speed control part 220 by the speed gain change part 16 may be performed, or either one may be performed.

Figure 7:
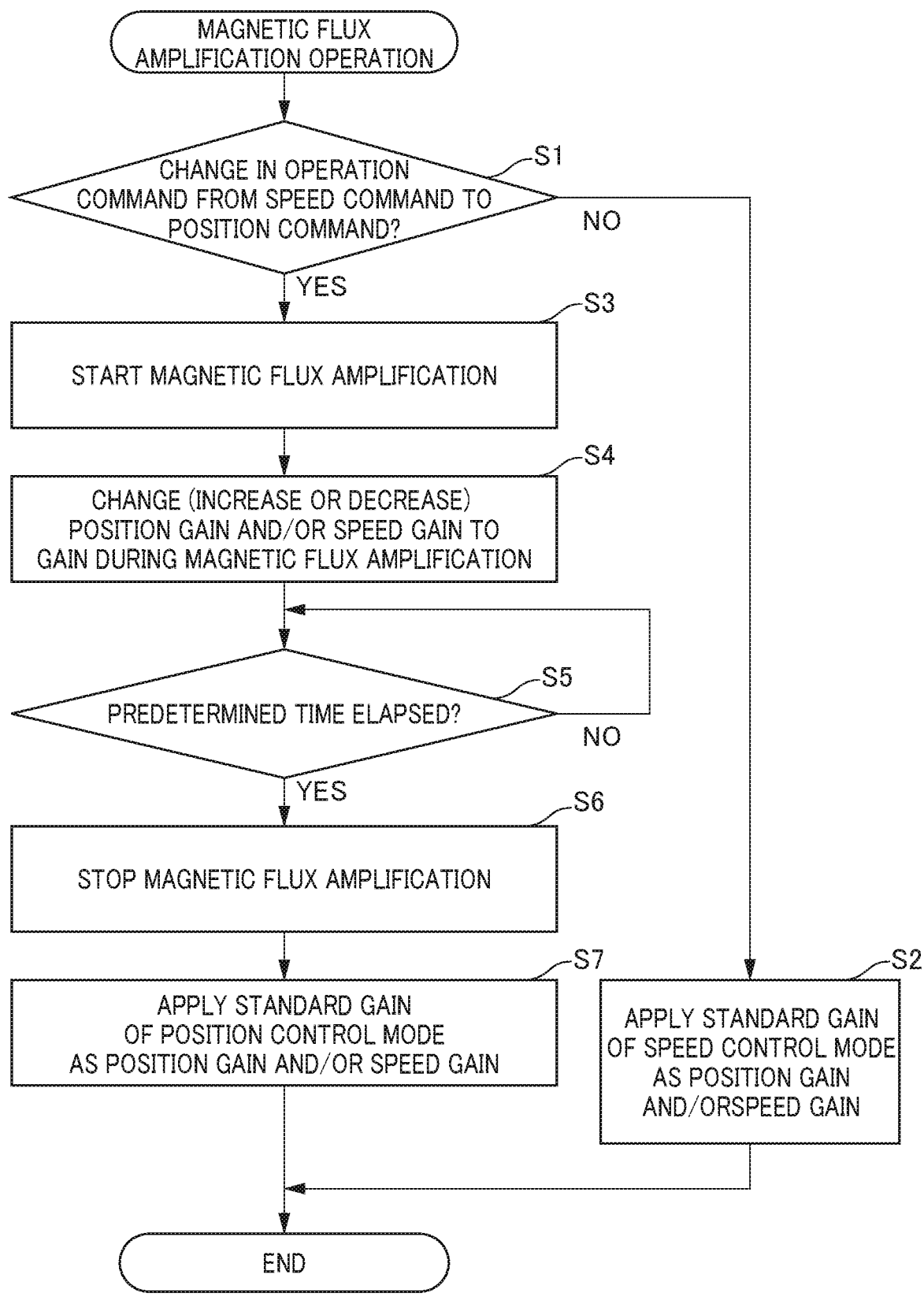
FIG. 7 is a flowchart of magnetic flux amplification operation by the motor control device according to the first embodiment.

Next, magnetic flux amplification operation by the motor control device 1 according to the first embodiment will be explained by referencing FIG. 7.

First, the change detection part 10 determines whether or not a change in operation command from speed command to position command has occurred (S1). In the case of a change in operation command from speed command to position command not being detected, the magnetic flux amplification part 12 does not perform magnetic flux amplification, the position gain change part 14 applies the standard gain of speed control mode as the position gain of the position control part 210, and the speed gain change part 16 applies the standard gain of speed control mode as the speed gain of the speed control part 220 (S2) (before t11 in FIGS. 6A and 6B).

On the other hand, if a change in operation command from speed command to position command is detected, the magnetic flux amplification part 12 performs magnetic flux amplification to temporarily increase the magnetic flux command or excitation current command (S3) (time t11 in FIGS. 6A and 6B).

At this time, the position gain change part 14 changes (increases or decreases) the position gain of the position control part 210 to the gain during magnetic flux amplification, and the speed gain change part 16 changes (increases or decreases) the speed gain of the speed control part 220 to the gain during magnetic flux amplification (S4) (time t11 in FIGS. 6A and 6B). It should be noted that both change of the position gain in the position control part 210 by the position gain change part 14 and change of the speed gain in the speed control part 220 by the speed gain change part 16 may be performed, or either one may be performed.

Next, the magnetic flux amplification part 12 determines if a predetermined time (t11–t12) has elapsed since magnetic flux amplification start (S5), and stops the magnetic flux amplification when the predetermined time has elapsed (S6) (time t12 in FIGS. 6A and 6B).

At this time, the position gain change part 14 applies the standard gain of position control mode as the position gain of the position control part 210, and the speed gain change part 16 applies the standard gain of the position control mode as the speed gain of the speed control part 220 (S7) (on and after t12 in FIGS. 6A and 6B).

As explained above, according to the motor control device 1 of the first embodiment, during a change in operation command from speed command to position command, magnetic flux amplification is temporarily performed to increase the magnetic flux command or excitation current command and thus increase the secondary magnetic flux of the induction motor 2. Even if performing magnetic flux weakening control during light load of the induction motor 2 for a reduction in heat generation of the induction motor 2 during speed control, it is thereby possible to quickly raise the secondary magnetic flux of the induction motor 2, and thus expedite the operation start of position control, during control mode switching from speed control to position control (high responsiveness in position control). In addition, according to the motor control device 1 of the first embodiment, at least one gain among the position gain in position control and speed gain in speed control is changed during magnetic flux amplification. For example, when increasing the gain in position control loop or speed control loop, it is possible to raise the convergence to the movement of the induction motor 2, and thus suppress the transient phenomenon in which the induction motor 2 moves. In addition, when decreasing the gain of the position control loop or speed control loop, it is possible to dull the movement of the induction motor 2, and thus possible to suppress the transient phenomenon in which the induction motor 2 moving (high stability of control). In this way, according to the motor control device 1 of the first embodiment, it is possible to achieve a reduction in heat generation of the induction motor 2 by way of magnetic flux weakening during light load of the induction motor 2, high responsiveness in position control of the induction motor 2 during change in operation command from speed command to position command, and high stability in control of the induction motor 2 during magnetic flux amplification.

Second Embodiment

In the first embodiment, a motor control device which performs control mode switching between speed control based on a speed command and position control based on a position command was explained. In the second embodiment, a motor control device which performs acceleration operation in speed control based on a speed command will be explained.

Figure 8:
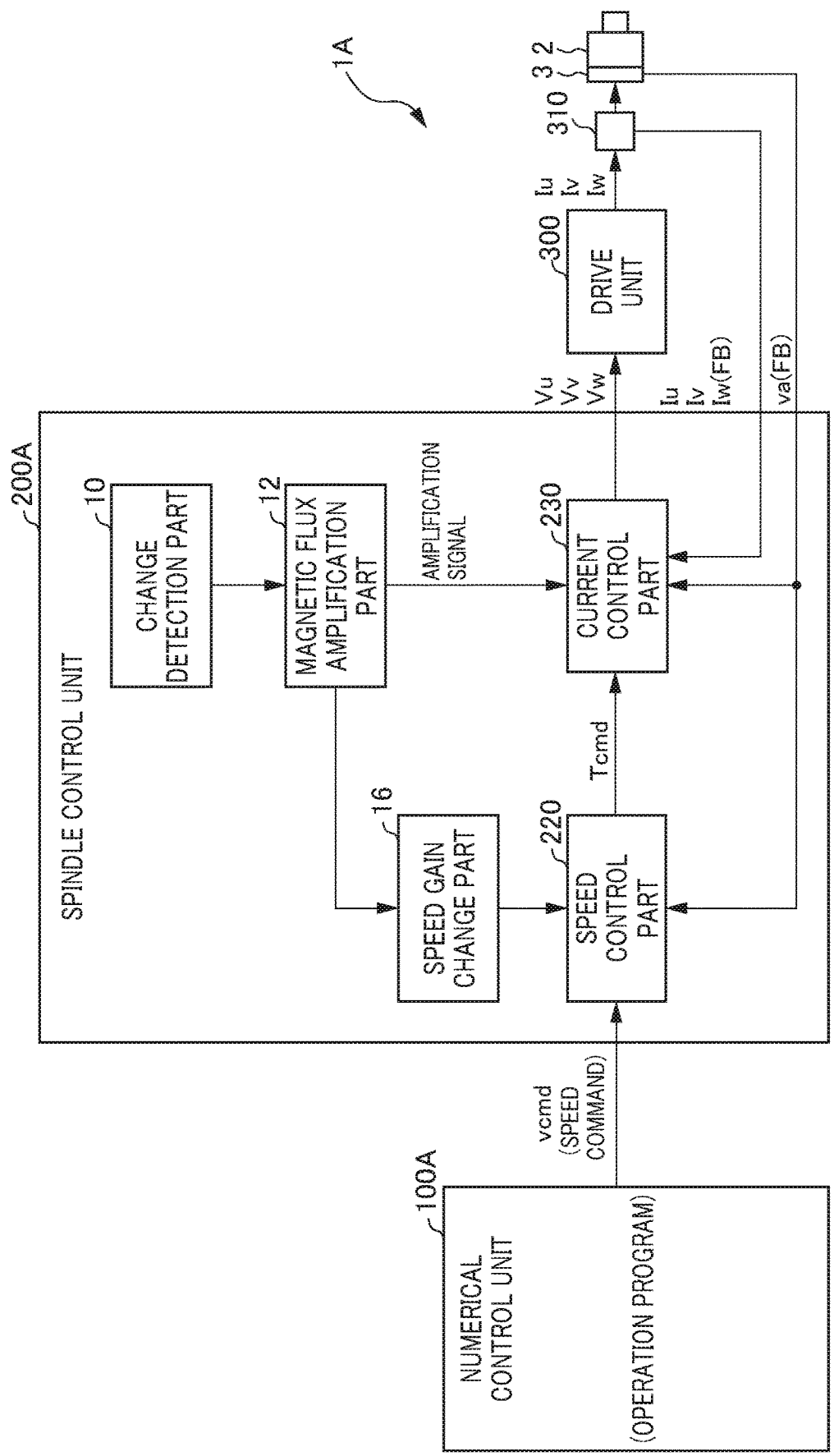
FIG. 8 is a view showing the configuration of a motor control device according to a second embodiment.

FIG. 8 is a view showing the configuration of the motor control device according to the second embodiment. The motor control device 1A shown in FIG. 8 includes a numerical control unit 100A and spindle control unit 200A in place of the numerical control unit 100 and spindle control unit 200 of the motor control device 1 shown in FIG. 1.

The numerical control unit 100A generates a speed command vcmd without performing switching of the control mode between speed control mode and position control mode based on the operation program (machining program), and supplies this to the spindle control unit 200A.

The spindle control unit 200A operates only in the aforementioned speed control mode, and controls the induction motor 2 to drive in accordance with the speed command vcmd from the numerical control unit 100A. The spindle control unit 200A is a configuration not including the position control part 210, control switching part 212 and position gain change part 14 of the spindle control unit 200 shown in FIG. 1. In the present embodiment, the speed control part 220 constitutes the operation control unit which controls the rotational speed of the spindle.

Also in the present embodiment, the motor control device 1A controls the secondary magnetic flux (excitation current) of the induction motor 2 to be small (magnetic flux weakening control) in the case of the load of the induction motor 2 being light and high torque not being required (during light load) in order for a heat generation reduction of the induction motor 2. For example, the current control part 230 shown in FIG. 2A changes the magnetic flux command according to the torque command, so as to make the magnetic flux command gradually smaller as the torque command becomes smaller as shown in FIG. 9, by the magnetic flux command generation section 231. In addition, the current control part 230 shown in FIG. 2B changes the magnetic flux command according to the torque command so as to make the excitation current command gradually smaller as the torque command becomes smaller, as shown in FIG. 9, by the excitation current command generation section 241.

For example, if performing accelerating operation from a stopped state when setting the magnetic flux command or excitation current command to 30% according to magnetic flux weakening control, since the torque command changes from 0% to 100%, the magnetic flux command or excitation current command changes from 30% to 100%. At this time, the actual secondary magnetic flux Φ2d rises to be delayed by the time constant $\tau = L_2/R_2$ relative to the excitation current I1$d$, i.e. magnetic flux command or excitation current command, as shown in FIG. 4.

Figure 10A:
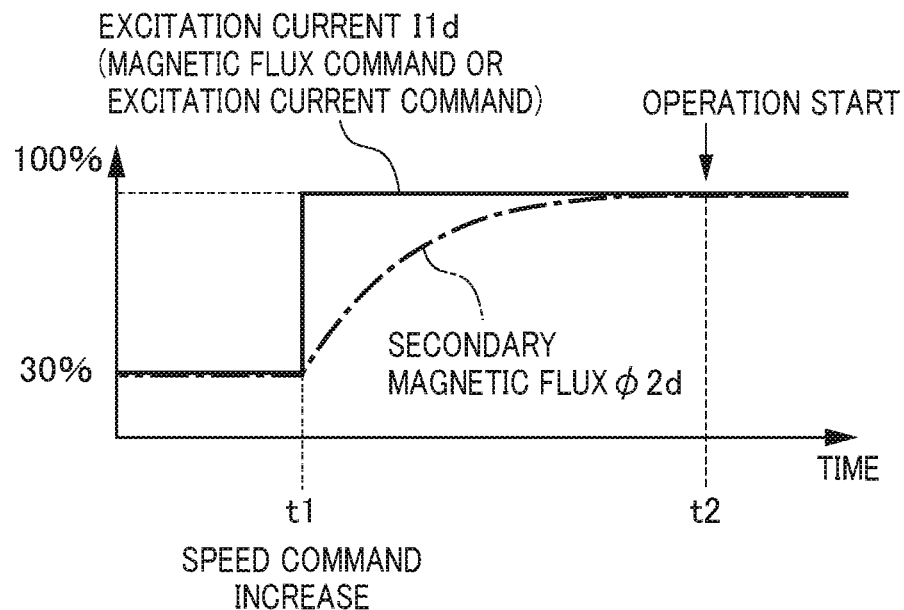
FIG. 10A is a schematic drawing of excitation current of an induction motor and secondary magnetic flux during a change (increase) in speed command.

As mentioned above, the torque T of the induction motor 2 is represented by the product of the secondary magnetic flux Φ2d and torque current (q-phase current) I1$q$, as shown in the above formula (3). For this reason, in the case of high torque being required such as during acceleration, i.e. in the case of the speed command increasing, as shown in FIG. 10A, immediately after increasing the magnetic flux command or excitation current command (immediately after time t1), it is not possible to output sufficiently torque due to the secondary magnetic flux Φ2d not sufficiently rising, and the acceleration time extends. For this reason, during acceleration, it has been necessary to start operation after waiting until the secondary magnetic flux sufficiently rises (time t2). If such a wait time occurs every time during acceleration, the machining time will lengthen.

Figure 10B:
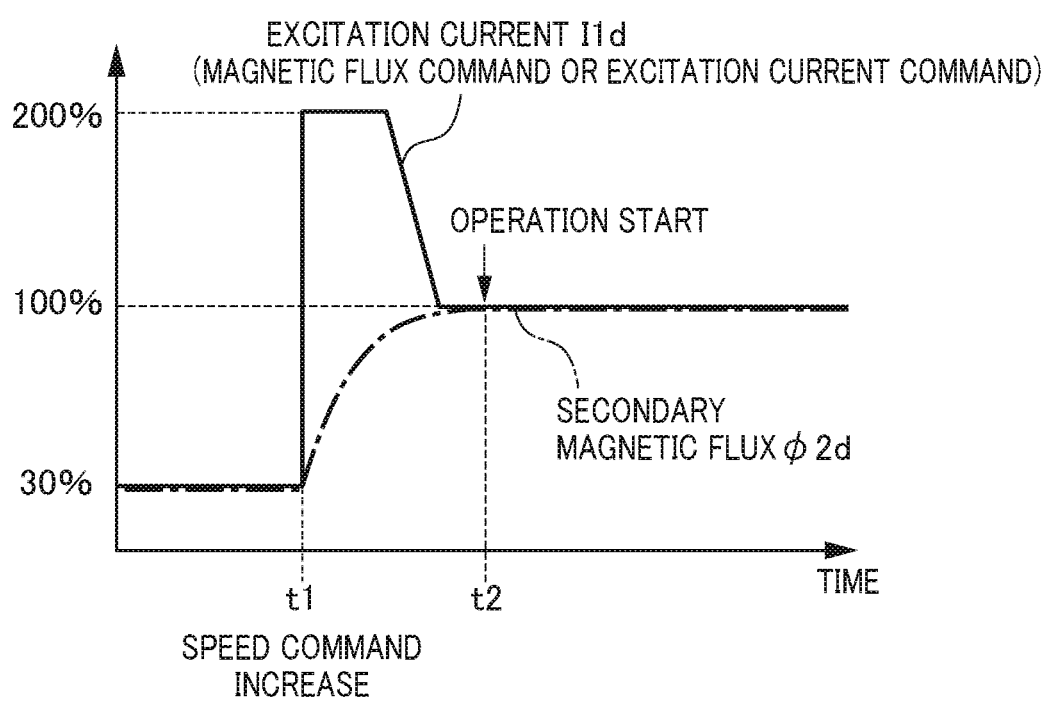
FIG. 10B is a schematic drawing of magnetic flux boost control of an induction motor.

In relation to this point, as mentioned above, there is technology which hastens the rise of secondary magnetic flux by increasing the magnetic flux command or excitation current command during acceleration to at least 100% (magnetic flux amplification, magnetic flux boost). For example, the current control part 230 shown in FIG. 2A amplifies the magnetic flux command to 200%, for example, for a predetermined time (time t1), during acceleration that sets from 30% magnetic flux command to 100% magnetic flux command, as shown in FIG. 10B, by way of the magnetic flux command generation section 231. In addition, the current control part 230 shown in FIG. 2B amplifies the excitation current command to 200%, for example, for a predetermined time (time t1), during acceleration that sets from 30% excitation current command to 100% excitation current command, as shown in FIG. 5B, by way of the excitation current command generation section 241. It is thereby possible to hasten the rise of secondary magnetic flux, and thus expedite the operation start after acceleration (time t2). However, there is a problem in that a transient phenomenon occurs where the torque variation occurring by quickly changing the excitation current becomes greater than the static friction force, whereby the induction motor 2 moves during magnetic flux amplification.

Therefore, also in the present embodiment, magnetic flux amplification to temporarily increase (t11–t12) the magnetic flux command or excitation current command during a change (increase) in speed command is performed, as well as changing (increase or decrease) the speed gain of the speed command, as shown in FIGS. 11A and 11B.

More specifically, as shown in FIG. 8, the spindle control unit 200A includes the change detection part 10, magnetic flux amplification part 12 and speed gain change part 16.

The change detection part 10 detects a change (increase) in operation command, i.e. change in operation command requiring increasing the secondary magnetic flux Φ2d of the induction motor 2.

The magnetic flux amplification part 12 performs magnetic flux amplification to temporarily increase the magnetic flux command or excitation current command, in a case of the change (increase) in speed command being detected by the change detection part 10. For example, the magnetic flux amplification part 12 transmits an amplification signal to the magnetic flux command generation section 231 of the current control part 230, as shown in FIGS. 8 and 2A. The magnetic flux command generation section 231 thereby increases the magnetic flux command, during acceleration (time t11) as shown in FIGS. 11A and 11B. In addition, the magnetic flux amplification part 12 transmits an amplification signal to the excitation current command generation section 241 of the current control part 230, as shown in FIGS. 8 and 2B. The excitation current command generation section 241 thereby increases the excitation current command during acceleration (time t11) as shown in FIGS. 11A and 11B.

The speed gain change part 16 changes the speed gain of the speed control part 220 when performing magnetic flux amplification by the magnetic flux amplification part 12. For example, as shown in FIG. 11A, the speed gain change part 16 may increase the speed gain of the speed control part 220 during magnetic flux amplification (t11–t12). Alternatively, as shown in FIG. 11B, the speed gain change part 16 may decrease the speed gain of the speed control part 220 during magnetic flux amplification (t11–t12).

Next, the magnetic flux amplification operation by the motor control device 1A according to the second embodiment will be explained by referencing FIG. 12.

First, the change detection part 10 determines whether or not a change (increase) in speed command has occurred (S11). In a case of a change (increase) in speed command is not detected, the magnetic flux amplification part 12 does not perform magnetic flux amplification, and the speed gain change part 16 applies the standard gain as the speed gain in the speed control part 220 (S12) (before t11 in FIGS. 11A and 11B).

On the other hand, when a change (increase) in speed command is detected, the magnetic flux amplification part 12 performs magnetic flux amplification to temporarily increase the magnetic flux command or excitation current command (S3) (time t11 in FIGS. 11A and 11B).

At this time, the speed gain change part 16 changes (increases or decreases) the speed gain of the speed control part 220 to the gain during magnetic flux amplification (S14) (time t11 in FIGS. 11A and 11B).

Next, the magnetic flux amplification part 12 determines if a predetermined time (t11–t12) has elapsed since magnetic flux amplification start (S5), and stops the magnetic flux amplification when the predetermined time has elapsed (S6) (time t12 in FIGS. 11A and 11B).

At this time, the speed gain change part 16 applies the standard gain as the speed gain of the speed control part 220 (S17) (on and after t12 in FIGS. 11A and 11B).

As explained above, according to the motor control device 1A of the second embodiment, upon a change (increase) in speed command, magnetic flux amplification is temporarily performed to increase the magnetic flux command or excitation current command and thus increase the secondary magnetic flux of the induction motor 2. Even if performing magnetic flux weakening control during light load of the induction motor 2 for a reduction in heat generation of the induction motor 2, it is thereby possible to quickly raise the secondary magnetic flux of the induction motor 2 during acceleration, obtaining sufficient torque, and thus possible to shorten the acceleration time, and possible to hasten the operation start after acceleration (high responsiveness in position control). In addition, according to the motor control device 1A of the second embodiment, the speed gain in speed control is changed during magnetic flux amplification. For example, when increasing the gain of the speed control loop, it is possible to raise the convergence to the movement of the induction motor 2, and thus suppress the transient phenomenon in which the induction motor 2 moves. In addition, when decreasing the gain of the speed control loop, it is possible to dull the movement of the induction motor 2, and thus possible to suppress the transient phenomenon in which the induction motor 2 moves (high stability of control). In this way, according to the motor control device 1A of the second embodiment, it is possible to achieve a reduction in heat generation of the induction motor 2 by way of magnetic flux weakening during light load of the induction motor 2, high responsiveness in control of the induction motor 2 during change (increase) in speed command, and high stability in control of the induction motor 2 during magnetic flux amplification.

Although embodiments of the present invention have been explained above, the present invention is not limited to the aforementioned embodiments, and various changes and modifications thereto are possible.

EXPLANATION OF REFERENCE NUMERALS

1, 1A motor control device
2 induction motor
3 encoder
10 change detection part
12 magnetic flux amplification part
14 position gain change part (gain change part)
16 speed gain change part (gain change part)
100, 100A numerical control unit
200, 200A spindle control unit
210 position control part (operation control part)
212 control switching part
220 speed control part (operation control part)
230 current control part
231 magnetic flux command generation section
232, 235, 238 subtracter
233 magnetic flux control section
234 magnetic flux estimation section
236 excitation current control section
237 torque current command generation section
239 torque current control section
240 2-phase/3-phase converter
241 excitation current command generation section
300 drive unit
310 current detector

What is claimed is:

1. A motor control device that controls an induction motor which drives a spindle of a machine tool, the motor control device comprising:
    an operation control part that generates a torque command based on an operation command, and controls a rotational position and/or rotational speed of the spindle;
    a current control part that generates an excitation current command to control secondary magnetic flux of the induction motor, and a torque current command to control torque of the induction motor based on the torque command, and performs vector control on the induction motor;

a change detection part that detects a change in operation command requiring increasing the secondary magnetic flux of the induction motor;

a magnetic flux amplification part that performs magnetic flux amplification to temporarily increase the excitation current command or a magnetic flux command for generating the excitation current command in the current control part, in a case of a change in the operation command being detected by the change detection part; and a gain change part that changes gain of the operation control part when performing magnetic flux amplification by the magnetic flux amplification part, wherein the gain change part decreases the gain of the operation control part, when performing magnetic flux amplification by the magnetic flux amplification part.

2. The motor control device according to claim 1, wherein a time of magnetic flux amplification by the magnetic flux amplification par is determined based on a time constant related to a change in secondary magnetic flux of the induction motor.

3. The motor control device according to claim 1, wherein the operation control part includes:

a position control part that controls rotational position of the spindle based on a position command; and a speed control part that controls rotational speed of the spindle based on a speed command, wherein a change in the operation command is a change in operation command from the speed command to the position command, wherein the gain change part includes:

a position gain change part that changes a position gain of the position control part; and a speed gain change part that changes a speed gain of the speed control part, and changes at least one among the position gain and the speed gain.

4. The motor control device according to claim 1, wherein the operation control part has a speed control part that controls the rotational speed of the spindle based on a speed command, wherein the change in the operation command is an increase in the speed command, and wherein the gain change part has a speed gain change part which changes the speed gain of the speed control part.

* * * * *